United States Patent [19]

Mauro et al.

[11] Patent Number: 5,009,911

[45] Date of Patent: Apr. 23, 1991

[54] FOODSTUFF CONTAINING AEWX STARCH

[75] Inventors: David J. Mauro, Dolton, Ill.; Susan L. Furcsik, Lake Station; Frances R. Katz, Crown Point, both of Ind.; Eugene J. Faron, II, Valpargiso, Ind.; David J. Gottneid, Griffith, Ind.; Frank J. Pustek, Munster, Ind.

[73] Assignee: American Maize-Products Company, Hammond, Ind.

[21] Appl. No.: 395,761

[22] Filed: Aug. 18, 1989

[51] Int. Cl.$^5$ .......................................... A23L 1/0522
[52] U.S. Cl. ...................... 426/578; 426/658; 426/589; 426/579; 426/661; 127/32; 127/67
[58] Field of Search ............. 426/573, 578, 579, 589, 426/661, 658; 127/32, 39, 60, 67

[56] References Cited

U.S. PATENT DOCUMENTS

| | | | |
|---|---|---|---|
| 4,584,024 | 4/1986 | Hisada et al. | 426/661 |
| 4,767,849 | 8/1988 | Friedman | 426/578 |
| 4,770,710 | 9/1988 | Friedman | 426/578 |
| 4,774,328 | 9/1988 | Friedman et al. | 426/578 |
| 4,789,557 | 12/1988 | Friedman et al. | 426/578 |
| 4,789,738 | 12/1988 | Friedman et al. | 426/578 |
| 4,790,997 | 12/1988 | Friedman | 426/578 |
| 4,792,458 | 12/1988 | Friedman et al. | 426/578 |

*Primary Examiner*—Jeanette Hunter
*Attorney, Agent, or Firm*—Lucas & Just

[57] ABSTRACT

The starch obtained from a plant having an aewx genotype acts as a thickener in foodstuffs having a low pH, 5 or below. The starch shows stability in acid foodstuff that is comparable to crosslinked waxy starch.

19 Claims, No Drawings

FOODSTUFF CONTAINING AEWX STARCH

This invention relates to starch and more particularly to an acid foodstuff containing starch which has been extracted from a plant having an amylose extender waxy (aewx) homozygous genotype.

Starch is a polymer of anhydroglucose which is produced by different plants and is generally categorized based on its plant source. For example, cereal starches are extracted from cereal grains such as maize, rice, wheat, barley, oats and sorghum; tuber and root starches are extracted from plants such as potato, sweet potato, arrowroot, yams and cassava; and waxy starches are extracted from plants such as waxy maize, waxy rice, waxy barley and waxy sorghum.

Conventionally, only two types of anhydroglucose polymers were thought to exist, amylose and amylopectin. Amylose is thought to be a linear polymer of alpha 1–4 bonded anhydroglucose units while amylopectin is thought to be a polymer comprised of linear chains of alpha 1–4 linked anhydroglucose units with occasional alpha 1–6 linkages. The alpha 1–4 chain extending from an alpha 1–6 linkage is typically referred to as a branch. In the plant, the polymers cluster together to form granules.

Each starch-bearing plant produces different percentages of amylose and amylopectin, different size granules and different polymeric weights for both the amylose and amylopectin. These differences produce markedly different properties in the starch.

There exists a number of recessive mutant genes in starch-bearing plants which have an effect on the properties of starch. By controlled breeding, these mutant genes can be expressed.

One combination of these mutant genes, waxy sugary-2 (wxsu2), has been found to possess freeze-thaw stability, see U.S. Pat. No. 4,428,972 issued Jan. 31, 1984 to Wurzburg et al.

It is well-known that starch and certain chemically modified starches are useful as thickeners in foodstuffs.

Conventionally, unmodified starches were not used in acid foodstuffs as a thickener because unmodified starch did not have the needed stability in the acid foodstuffs. Thus, conventional thinking dictated that chemically modified starches, generally a crosslinked starch, had to be used as a thickener in acid foodstuffs.

It has now been discovered that starch obtained from a starch bearing plant having an amylose extender waxy (aewx) homozygous genotype has acid stability comparable to crosslinked waxy starches and can be used in place of the chemically modified waxy starch in an acid foodstuff as a thickener. It has further been discovered that an acid foodstuff made with starch obtained from a starch-bearing plant having an aewx genotype as a thickener is comparable to the acid foodstuff made with a crosslinked waxy starch. Additionally, it has been discovered that an acid foodstuff made with a starch extracted from a starch-bearing plant having an aewx genotype as a thickener is comparable to the acid foodstuff made with certain dual modified waxy starches.

The term "acid foodstuffs" means foodstuffs having a pH less than about 5.0 and more particularly having a pH between 1.0 and 4.5. Typically, acid foodstuffs include lemon pie filling, tomato sauce and tomato paste.

It has also been discovered that the starch obtained from a starch-bearing plant having an aewx genotype can be used as a thickener in place of crosslinked waxy starches in high temperature, high pressure cooking. Such high temperature, high pressure cooking may be referred to as retort cooking or a retorting process.

It is both surprising and unexpected that starch extracted from a starch-bearing plant having an aewx genotype imparts a viscosity to an acid foodstuff comparable to the viscosity imparted to the acid foodstuff by either a crosslinked waxy starch or a dual modified waxy starch since conventional thinking dictated that a crosslinked waxy starch or a dual modified waxy starch was needed to impart such viscosity to an acid foodstuff.

The discovery that the starch obtained from a plant having an aewx genotype can replace chemically modified starches may provide an economic advantage to the user.

Starch extracted from a plant having an amylose extender waxy homozygous genotype is known and its use in the food industry has been suggested in an article by T. Yamada et al. entitled "A Novel Type of Corn Starch from a Strain of Maize" published in Starke 30 (1978, Nr. 5, p. 145–147).

In order to employ starch obtained from a plant having an aewx genotype in acid foodstuffs, the starch obtained from a plant having an aewx genotype, a slurry of the starch, or a sol of the starch is added to the foodstuff in a conventional manner.

Alternatively, starch obtained from a plant having an aewx genotype is mixed with an acid foodstuff or a slurry comprising water and the starch is mixed with the acid foodstuff and the resulting mixture cooked to produce a thickened foodstuff.

A thickened acid foodstuff made in accordance with the present invention comprises a foodstuff, water and an effective amount of an aewx starch extracted from a plant having an aewx genotype wherein the acid foodstuff has a pH of about 5.0 and below and the foodstuff has a viscosity comparable to an acid foodstuff made with a crosslinked waxy starch extracted from the same plant source as the aewx starch.

Preferably, a thickened acid foodstuff made in accordance with the present invention comprises a foodstuff and a sol comprising water and an effective amount of an aewx starch extracted from maize having an aewx genotype, wherein said acid foodstuff has a pH of about 5.0 and below and said sol has a viscosity profile under acid conditions as determined by an acid Brabender amylogram greater than a viscosity profile under acid conditions as determined by an acid Brabender amylogram for a sol of a common or waxy maize starch.

In acid foodstuffs, in order to replace chemically modified waxy starches with starch obtained from a plant having an aewx genotype, a replacement ratio of about 1:1 conventional chemically modified waxy starch:starch obtained from a plant having an aewx genotype, may be employed. Larger or smaller amounts of the starch obtained from a plant having an aewx genotype may be used to replace the conventional chemically modified waxy starch.

It has been found that the starch obtained from a plant having an aewx genotype, when added to an acid foodstuff, acts as a thickener. An effective amount of starch obtained from a plant having an aewx genotype needs to be added to the acid foodstuff in order to act as a thickener. Typically, about 1 to about 20% by weight foodstuffs of starch obtained from a plant having an aewx genotype is added to the acid foodstuffs. Starch obtained from a plant having an aewx genotype is mixed with the foodstuff or a slurry comprising the starch obtained from a plant having an aewx genotype and water is mixed with a foodstuff and the resulting mixture is cooked to the desired degree to obtain a thickened foodstuff. When the starch itself or a slurry containing the starch itself is mixed with a foodstuff, the resulting mixture must be cooked in order to provide a thickened foodstuff. The mixing as well as the cooking is accomplished in a conventional manner. Cooking is carried out at a temperature of about 90° C. and above. Cooking time is about ten minutes but may vary depending on the amount of foodstuff present and the amount of shear that the mix is subject to during cooking.

The starch obtained from a plant having an aewx genotype is employed in a retort process by mixing starch obtained from a plant having an aewx genotype, a slurry, or a sol containing the same with a foodstuff suitable for retorting. Generally water is included in the mixture. Conventionally, the pH of such a mixture is adjusted, subsequently sealed in a container and subjected to a conventional retorting process. During such retorting process the contents of the container preferably reaches above about 104° C. for a period of about 5 to about 25 minutes thereby sterilizing the contents of the sealed container. The amount of starch obtained from a plant having an aewx genotype employed for such a retort process is an effective amount. Preferably the starch of the present invention is employed in an amount between about 1 to about 20% by weight based on the total weight of the container contents. The sol, a slurry or starch obtained from a plant having an aewx genotype is conventionally mixed with the foodstuff.

In order to prepare a sol in accordance with the present invention, a slurry is prepared which comprises water and an effective amount of starch extracted from a plant of the aewx genotype and the slurry subjected to a cooking step. The slurry is cooked as necessary to provide a thickener composition which exhibits thickening characteristics comparable to sols made from conventional chemically modified starches. The preferred amount of starch used in the slurry constitutes about 1 to about 20% by weight of slurry. Generally, cooking entails raising the temperature of the slurry to above about the gelatinization temperature of the starch and subjecting the starch to enough shear such that the granules rupture and a paste is formed. It is not necessary that all the granules rupture. Cooking time is about ten minutes at a temperature of about 90° C.

If the starch has been made "cold water dispersible", then the cooking step can be eliminated.

The term "cold water dispersible" is a term used in the starch industry to mean a starch product that may be stirred up into a paste or sol with cold water. Cold water dispersible starch is sometimes referred to as pregelatinized starch.

The term "starch" as used in the specification and claims means not only the substantially pure starch granules as extracted from a starch-bearing plant but also grain products of the starch granule such as flour, grit, hominy and meal.

The term "amylose extender waxy" or "aewx" genotype as used in the specification and claims means not only the aewx homozygous genotype, aeaewxwx, which has been obtained by standard plant breeding techniques but also the aewx genotype which has been moved to another portion of the plant genome by translocation, inversion or any other method of chromosome engineering to include variations thereof whereby the disclosed properties of the aewx starch are obtained.

Any plant source which produces edible starch and which can be crossbred to produce a plant having an aewx homozygous genotype may be used. It has been found that varieties of maize, rice, barley and sorghum have both the amylose extender (ae) and the waxy (wx) mutant genes. Maize is the preferred plant source. The amylose extender gene in maize is reported to be on chromosome 5 while the waxy gene in maize is reported to be located on chromosome 9. The location of such genes is published in the open literature.

Generally, to obtain a starch-bearing plant with both double recessive mutants of the ae and wx genotype, a plant of an ae mutant is crossed with a plant having a wx mutant and thereafter inbred to obtain a plant homozygous in aewx. After the homozygous aewx genotype is obtained, standard breeding techniques are used to obtain hybrid vigor. Hybrids are preferred because of their high starch yield compared to inbred lines. The method of crossing plants and of obtaining specific genotypes in the offspring as well as breeding to obtain hybrid vigor is well known.

Extraction of starch from the plant is well known and typically entails a milling process. In accordance with the present invention, a wet milling process is used to advantage to extract the corn starch from the corn kernels. Corn wet milling comprises the steps of steeping and grinding the corn kernel and then separating the starch from the other components of the kernel. Prior to steeping, the kernels are subjected to a cleaning process to remove any debris which may be present. This cleaning process is usually done at the wet milling plant. The kernels are then steeped in a steep tank where the kernels are contacted with a countercurrent flow of water at an elevated temperature of about 50° C. and containing sulfur dioxide in an amount between about 0.1 to about 0.2% by weight water. The kernels are maintained in the steep tank for about 24 to 48 hours. Next, the kernels are dewatered and subject to a first set of attrition type mills.

The first set of mills generally grind and rupture the kernels, causing the germ to be released from the rest of the kernel. A typical attrition type mill used in commercial wet milling processes is sold under the brand name Bauer. The released germ is then separated from the other parts of the kernel by centrifugation. Throughout the grinding steps of the wet milling process the kernel and the kernel components are maintained in a slurry.

The remaining kernel components, which include starch, hull, fiber and gluten, are subjected to a second set of attrition type mills such as the Bauer Mill, to further grind the components and separate the hull and fiber from the starch and gluten. Hull and fiber are generally referred to as bran. Washing screens are used to separate the bran from the starch and gluten. The starch and gluten pass through the screens while the bran does not.

Next, the starch is separated from the protein. This step is done either by centrifugation or by a third grind followed by centrifugation. A commercial centrifugation separator suitable for the present process is the Merco centrifugal separator.

The slurry which contains the starch granules is then dewatered and the resulting granules washed with fresh water and dried in a conventional manner, preferably to about 12% moisture.

In this manner, the substantially pure starch from a starch bearing plant of the aewx genotype is obtained.

Alternatively to the drying step, the starch may be left in suspension and subject to further modification.

In order to increase the acid stability of starch obtained from a plant having an aewx genotype or to impart other characteristics, it may be desirable to further crosslink, esterify and/or etherify the starch.

In order to etherify the starch obtained from a plant having an aewx genotype, a slurry of starch is made up having about 5 to about 40% by weight starch. The pH of the slurry is adjusted to about 10 to about 12, preferably with sodium hydroxide. Next, an etherification agent such as ethylene oxide or propylene oxide is added to the slurry in an amount of about 0.5 to about 25% depending on the etherifying agent and desired degree of substitution.

In order to crosslink the starch obtained from a plant having an aewx genotype, a slurry of starch is made up of about 5 to about 40% by weight starch. The pH of the slurry is adjusted to about 8 to about 12, preferably with sodium hydroxide. Optionally, a salt may be added to the slurry to effect swelling of the granules. Then the slurry is reacted with a crosslinking agent such as phosphorous oxychloride, trimetaphosphate salt, or epichlorohydrin at about 21° to about 50° C. for about 0.5 to about 5 hours. The length of time of the reaction will depend on the amount of crosslinking agent used, the specific crosslinking agent chosen, and the reaction conditions.

In order to esterify the starch obtained from a plant having an aewx genotype, a slurry of starch is prepared having about 5 to about 40% by weight starch. The pH of the slurry is then adjusted to about 8 to about 10 and an esterification agent is added to the slurry such as vinyl ester, acetyl halides, or acid anhydrides such as acetic anhydride or succinic anhydride. The esterification agent is added slowly while maintaining the pH of the slurry. The reaction is contained for about 0.5 to about 5 hours at about 27° to about 50° C. Once the reaction is completed to the desired degree of substitution, the slurry is neutralized, dewatered, washed and dried.

Any combination of these modifications may be employed on starch obtained from a plant having an aewx genotype.

These and other aspects of the present invention may be more fully understood with reference to the following examples.

EXAMPLE 1

This example illustrates the extraction of the starch of the present invention from an aewx maize kernel produced by conventional crossbreeding and tests the starch to determine its various characteristics. The tests as well as the results obtained therefrom are given in Table I below. The extraction process as well as the test procedures followed are outlined following Table I below:

TABLE I

| Test | Present Invention | |
|---|---|---|
| | Sample A | Sample B |
| Percent Protein (dry basis) | 0.93 | 0.94 |
| Percent Oil (dry basis) | 0.09 | 0.01 |
| Percent Apparent Amylose (starch basis) | 20.6 | 26.9 |
| DSC Gelatinization Temp. | 78.6° C. | 84.2° C. |

TABLE I-continued

| Test | Present Invention | |
|---|---|---|
| | Sample A | Sample B |
| Regular Brabender Amylograms | | |
| Initial Rise | 84.5° C. | 90.5° C. |
| Heating Peak | 215 Bu | 260 Bu |
| Heating Final | 215 Bu | 260 Bu |
| Cooling Peak | 290 Bu | 330 Bu |
| Cooling Final | 290 Bu | 330 Bu |
| Acid Brabender Amylograms | | |
| Initial Rise | 80° C. | 84.5° C. |
| Heating Peak | 140 Bu | 210 Bu |
| Heating Final | 75 Bu | 130 Bu |
| Cooling Peak | 75 Bu | 120 Bu |
| Cooling Final | 75 Bu | 120 Bu |
| Brookfield Viscosities (RPMs) | | |
| 10 | 5600 cps | 5150 cps |
| 20 | 3200 cps | 3150 cps |
| 50 | 1720 cps | 1700 cps |
| 100 | 1100 cps | 980 cps |
| 50 | 1680 cps | 1660 cps |
| 20 | 3100 cps | 2900 cps |
| 10 | 5400 cps | 4850 cps |
| Hercules Viscosities (RPMs) | | |
| 550 | 41.64 cps | 57.42 cps |
| 1100 | 27.84 cps | 40.02 cps |
| 1650 | 22.04 cps | 33.06 cps |
| 2200 | 19.14 cps | 27.52 cps |
| 1650 | 19.72 cps | 30.16 cps |
| 1100 | 22.62 cps | 33.93 cps |
| 550 | 27.76 cps | 43.5 cps |

CROSSBREEDING

In order to perform the crossbreeding process, typically maize plants having the mutant gene ae were cross-pollinated with maize plants having the mutant gene wx. From the mature ears of some of these plants, kernels having aewx homozygous genotype were produced. Such kernels were used to produce starch in accordance with the present invention and to provide seed for future maize plants of the aewx homozygous type. Sample A was grown in a dent corn background, which was a cross OHIO 43/W64A.

EXTRACTION PROCESS

The following extraction process was used to extract the starch from the kernel:

STEEPING

Steeping was carried out by adding maize kernels to water having a 0.2% $SO_2$ content and holding the temperature of the steep water at 50° C. for 48 hours. The steep water was circulated through the steep container. After the 48 hours of steeping, the kernels were dewatered and washed with water.

GRINDING AND SEPARATING

A mixture of 1:1 kernels to water in a weight ratio was prepared and added to a Waring blender equipped with a dull blade. The Waring blender was put on grind for one minute to mill the kernels. The resulting mash was poured onto a 40 mesh screen and what passed through the 40 mesh screen was passed through a 200 mesh screen and subsequently through a 325 mesh screen. The resulting filtrate contained starch and protein. That which did not pass through the first 40 mesh screen was put back into the Waring blender with water in a 1:1 weight ratio of kernels to water. This time a sharp blade was used and the Waring blender was set for one minute on grind. The resulting mash was then subjected to a 40 mesh screen and then the filtrate was subjected to a 200 mesh screen and finally to a 325 mesh screen. The final filtrate from both the dull blade grind and the sharp blade grind was dewatered and contained starch and protein. The starch and protein were reslurried and subjected to three separate centrifuges to remove the starch from the protein.

The final starch was then filtered and dried in an oven at 43° C. to a moisture content of approximately 10%.

In this manner, starch was extracted from corn kernels in the lab.

The percent protein was determined by a standard Corn Refiners Association (CRA) method (Kjeldahl method).

The percent oil was also determined using a standard CRA method by extracting the oil from dry, ground kernels using carbon tetrachloride for sixteen hours.

The percent apparent amylose was determined using standard calorimetric iodine procedures wherein the starch is first gelatinized with sodium hydroxide and then reacted with an iodine solution and the resulting sample measured using a spectrophotometer in a 1 cm cell at 600 nm against a blank of 0.2% iodine solution. It should be noted that, although the apparent amylose content was around 20%, it is generally thought that aewx starch is virtually 100% amylopectin and that the apparent amylose content is due to the relatively long chains of the branched amylopectin. These chains are long compared to conventional, native waxy starch.

The DSC gelatinization temperature was measured using a scanning calorimeter manufactured by Mettler (Model No. 300) using a 30% solid starch following the procedure outlined in the owner's manual for that model.

Two Brabender amylographs were run; one in a non-acid environment and one in an acid environment. Both were run at 5.5% solids using a 90 gram sample with 125 gram cartridge at 100 RPM. The exact procedure used is outlined in the Amylograph Handbook of the American Association of Cereal Chemists, 1982 Edition, at pages 17 and 18. The respective paddle for the 90 gram cup was used. The difference between the acid and the regular Brabender was that 1.65 grams of glacial acetic acid was added to the sample to drop the pH of the sample to about 3.0 prior to running of the samples. Such acid test is used to show stability in acid conditions.

The initial rise was the temperature at which the pen moves away from the baseline.

Both acid and regular samples were subjected to identical heat profiles. The sample starch at room temperature and the rapid heat mode of the instrument was used to heat the sample to 50° C. Once 50° C. was reached, the instrument was set at a controlled rate of heating, 1.5° C./minute, until a temperature of 95° C. was reached. The sample was then held at 95° C. for 30 minutes. During this period of heating, the highest viscosity obtained by the sample was labeled Heating Peak. The Heating Final was the last viscosity obtained by the sample at the end of the heating cycle. Next, the sample was cooled at 1.5° C./minute to a temperature of 50° C. The sample was then held at 50° C. for 30 minutes. The largest viscosity measurement taken during this cooling cycle was the Cooling Peak and the final viscosity at the end of the cooling cycle was the Cooling Final.

Brabender curves are a well known tool for determining characteristics of starch.

Brookfield viscosities, another well-known method used for analyzing starch, were measured for the starch of the present invention in Table I above. In order to run this test, the starch slurry (as it came from the regular, non-acid Brabender test) was used for the Brookfield test.

A Brookfield viscometer Model RV was used following standard procedures to obtain these values. The tests were run at 50° C. with each RPM being run for a twenty second time interval.

Hercules viscosities were run on a Kaltec Model No. 244RC (manufactured Aug. 31, 1975) following the procedure outlined in the operator's manual. Each test was run at 24° C. using bob A. A 460 gram sample of starch paste at 5.5% solids was used for this test. Hercules viscosities measured high shear resistance of starch in an acid environment.

EXAMPLE 2

This example illustrates the use of starch obtained from a plant having an aewx genotype to replace a commercial, chemically modified starch in a lemon pie filling without egg yolk. Table IIA lists the ingredients used to make three pie fillings. The only difference between each filling was the starch employed.

TABLE IIA

| Ingredient | Percent | Grams |
|---|---|---|
| Dextrose, CPC | 1.52 | 15.2 |
| Water | 61.36 | 613.6 |
| Sugar, fine granule | 15.20 | 152.0 |
| Fro-Dex 15 | 6.90 | 69.0 |
| Fro-Dex 42 | 6.60 | 66.0 |
| Citric acid | .25 | 2.5 |
| Lemon flavor (Int. Bakers Supply) | .7 | 7.0 |
| Sodium Benzoate | .10 | 1.0 |
| FD&C Yellow #5, 5% solution | — | (1 ml) |
| Shortening, Crisco | 4.0 | 40.0 |
| Starch | 4.0 | 40.0 |
| | 100.0 | 1000.0 |

The three starches employed were: starch obtained from a plant having an aewx genotype; 400 Stabilizer; and W-11. Both 400 Stabilizer and W-11 are crosslinked waxy starches sold by American Maize-Products Company.

In order to make the pie fillings, the shortening was melted and all remaining ingredients were added and mixed. Then the three mixes were heated to 90.6° C. and held there for three minutes.

Containers were filled with the hot filling, sealed and allowed to cool.

After 24 hours each of the three mixes were tested. Table IIB lists the results:

TABLE IIB

| Starch | pH | Viscosity |
|---|---|---|
| 400 Stabilizer | 3.02 | 17,780 cps |
| W-11 | 3.30 | 3,150 cps |
| aewx | 2.67 | 4,350 cps |

As can be seen from Table IIB, starch obtained from a plant having an aewx genotype produced results comparable to the commercial crosslinked waxy starch, W-11. The viscosity was measured by a Brookfield viscometer.

EXAMPLE 3

Using the formulation in Table IIA, three more pie fillings were made to test the starch obtained from a plant having an aewx genotype under retort conditions.

The ingredients of Table IIA were mixed using the three starches: starch obtained from a plant having an aewx genotype, 400 Stabilizer, and W-11. Then the pie fillings were added to containers and sealed. The sealed containers were cooked at 121° C. for 30 minutes. The internal pressure of the containers during cooking was 15–18 psi (10.3–12.4 ×$10^3$ Pa). After cooling, the sealed containers were allowed to stand at room temperature for about 24 hours. Then the containers were opened and the viscosity of the contents tested using the procedure of Example 2. Table III lists the results:

TABLE III

| Starch | pH | Viscosity |
| --- | --- | --- |
| 400 Stabilizer | 3.02 | 80 cps |
| W-11 | 3.30 | 3610 cps |
| aewx | 2.67 | 1575 cps |

It can be seen from Table III above that starch obtained from a plant having an aewx genotype produces comparable results to that of a crosslinked waxy starch.

EXAMPLE 4

This example illustrates starch obtained from a plant having an aewx genotype compared to a commercial crosslinked waxy starch, W-11. Two lemon pie fillings containing fresh egg yolk were made with the following ingredients:

TABLE IVA

| Ingredient | Percent | Grams |
| --- | --- | --- |
| Water | 61.36 | 613.6 |
| Sugar, fine granule | 15.20 | 152.0 |
| Fro-Dex 15 | 6.9 | 69.0 |
| Fro-Dex 42 | 6.9 | 69.0 |
| Citric acid | .25 | 2.5 |
| Lemon flavor (Int. Bakers Supply) | .70 | 7.0 |
| Sodium Benzoate | .10 | 1.0 |
| FD&C Yellow #5, 5% solution | — | (0.5 ml) |
| Shortening, Crisco | 4.0 | 40.0 |
| Starch | 4.0 | 40.0 |
| Egg yolk, fresh | 1.52 | 15.2 |
| | 100.0 | 1000.0 |

In order to make the two pie fillings, the shortening was melted into a kettle and both the dry ingredients and water were mixed. The mixture was heated to 90.6° C. and held there for three minutes. The mixture was then cooled to 71° C. and the egg yolk was added and mixed. The containers of pie fillings were then sealed and allowed to stand at room temperature for 24 hours. After 24 hours, the mixture was tested for viscosity.

TABLE IVB

| Starch | pH | Viscosity |
| --- | --- | --- |
| W-11 | 3.46 | 6075 cps |
| aewx | 3.44 | 5190 cps |

EXAMPLE 5

Viscosity profiles under acid conditions of an aewx starch extracted from corn kernels were compared to viscosity profiles under acid conditions of both a common corn starch and a waxy corn starch. The aewx starch had surprising acid stability. The results are reported in Table V below.

TABLE V

| Viscosity Profiles (Acid Brabender Amylogram) | | | |
| --- | --- | --- | --- |
| | Common | Waxy | aewx |
| Initial Rise (°C.) | 84 | 72.8 | 84.5 |
| Initial Peak | 215 | 526 | 210 |
| Heating Final | 68 | 31 | 130 |
| Cooling Peak | 75 | 31 | 120 |
| Cooling Final | 75 | 31 | 120 |
| Percent Apparent Amylose | 27.6 | 2.4 | 26.9 |

The aewx sample was Sample B from Example 1 above. The values given for the common was a mean of typical common corn starches. The values given for the waxy was a mean of typical waxy corn starches. Both the common and the waxy were commercial products sold by American Maize-Products Company.

The apparent amylose content was determined according to Example 1 above.

The viscosity profiles under acid conditions were acid Brabenders determined in a manner outlined in Example 1 above.

It is both surprising and unexpected that aewx starch produced viscosities under acid conditions greater than a waxy starch or a common starch under acid conditions.

This example illustrates that a sol of aewx starch has a viscosity profile under acid conditions greater than the viscosity profile under acid conditions of a native common or waxy maize starch.

As noted in Example 1 above, it is generally thought that aewx starch is virtually 100% amylopectin and the apparent amylose content is due to the relatively long chain. It is thought that the ae gene causes the short chain of the waxy starch to be longer than normal for native waxy starch. Common starch is typically considered to be made up of about 30% amylose and about 70% amylopectin while waxy starch is generally considered to be virtually 100% amylopectin.

It will be understood that the claims are intended to cover all changes and modifications of the preferred embodiments of the invention herein chosen for the purposes of illustration which do not constitute a departure from the spirit and scope of the invention.

What is claimed is:

1. A thickened acid foodstuff comprising a foodstuff, water, and a starch extracted from a starch-bearing plant having an amylose extender waxy genotype, said acid foodstuff having a pH of about 5.0 and below, said amylose extender waxy starch being present in an amount effective to provide thickening characteristics to said acid foodstuff after said acid foodstuff is retorted, and wherein said thickened acid foodstuff exhibits substantially similar viscosity characteristics as a thickened foodstuff made using an effective amount of a crosslinked waxy starch extracted from the same type of starch-bearing plant from which said amylose extender waxy starch is extracted, said crosslinked waxy starch also being present in an amount effective to provide thickening characteristics to a thickened acid foodstuff made with the crosslinked starch, and said viscosity being measured by a Brabender amylogram.

2. The thickened acid foodstuff of claim 1 wherein said starch-bearing plant is maize.

3. The thickened acid foodstuff of claim 1 wherein said foodstuff is selected from the group consisting of lemon pie filling, tomato sauce, and tomato paste.

4. The thickened acid foodstuff of claim 1 wherein said amylose extender waxy starch is present in an amount of about 1% to about 20% based on the weight of said foodstuff.

5. A thickened acid foodstuff comprising a foodstuff and a sol comprising water and a starch extracted from a starch-bearing plant having an amylose extender waxy genotype, said acid foodstuff having a pH of about 5.0 and below, said amylose extender waxy starch being present in an amount effective to provide thickening characteristics to said sol after said sol is retorted, and wherein said sol exhibits higher viscosity than a sol made using an effective amount of a common or waxy starch extracted from the same type of starch-bearing plant from which said amylose extender waxy starch is extracted, the common or waxy starch being present in an amount effective to provide thickening characteristics to the sol after retorting and said viscosity being measured by a Brabender amylogram.

6. The thickened acid foodstuff of claim 5 wherein said starch-bearing plant is maize.

7. The thickened acid foodstuff of claim 5 wherein said foodstuff is selected from the group consisting of lemon pie filling, tomato sauce, and tomato paste.

8. The thickened acid foodstuff of claim 5 wherein said amylose extender waxy starch is present in an amount of about 1% to about 20% based on the weight of said foodstuff.

9. A method for making a thickened acid foodstuff comprising combining a foodstuff, water, and a starch extracted from a starch-bearing plant having an amylose extender waxy genotype, said acid foodstuff having a pH of about 5.0 and below, said amylose extender waxy starch being present in an amount effective to provide thickening characteristics to said acid foodstuff after said acid foodstuff is cooked, and cooking said combination as necessary to provide a thickened acid foodstuff, and wherein said thickened acid foodstuff exhibits substantially similar viscosity characteristics as a thickened acid foodstuff made using an effective amount of a crosslinked waxy starch extracted from the same type of starch-bearing plant from which said amylose extender waxy starch is extracted, said crosslinked waxy starch also being present in an amount effective to provide thickening characteristics to a thickened acid foodstuff made with the crosslinked starch, and said viscosity being measured by a Brabender amylogram.

10. The method of claim 9 wherein said starch-bearing plant is maize.

11. The method of claim 9 wherein said foodstuff is selected from the group consisting of lemon pie filling, tomato sauce, and tomato paste.

12. The method of claim 9 wherein said amylose extender waxy starch is present in an amount of about 1% to about 20% based on the weight of said foodstuff.

13. The method of claim 9 wherein said cooking step is carried out at a temperature above about 90° C.

14. The method of claim 9 wherein said cooking step is carried out in a sealed container at a temperature of above about 104° C. for a period of about 5 to about 25 minutes.

15. A method for making a thickened acid foodstuff comprising forming a slurry of water and a starch extracted from a starch-bearing plant having an amylose extender waxy genotype, said amylose extender waxy starch being present in an amount effective to provide thickening characteristics to said slurry after said slurry is cooked; and cooking said slurry to form a sol wherein said sol exhibits higher viscosity under acid conditions than a sol made using an effective amount of a common or waxy starch extracted from the same type of starch-bearing plant from which said amylose extender waxy starch is extracted, said common or waxy starch being present in an amount effective to provide thickening characteristics after cooking to a sol made with common or waxy starch and said viscosity being measured by a Brabender amylogram; and combining said sol with a foodstuff wherein said foodstuff has a pH of about 5.0 and below to form a thickened acid foodstuff.

16. The method of claim 15 wherein said starch-bearing plant is maize.

17. The method of claim 15 wherein said foodstuff is selected from the group consisting of lemon pie filling, tomato sauce, and tomato paste.

18. The method of claim 15 wherein said amylose extender waxy starch is present in an amount of about 1% to about 20% based on the weight of said foodstuff.

19. The method of claim 15 wherein said cooking temperature of said sol is above about 90° C. for a period of time of about 10 minutes.

* * * * *